(12) United States Patent
Morris et al.

(10) Patent No.: US 6,654,614 B2
(45) Date of Patent: *Nov. 25, 2003

(54) IMPLEMENTATION OF POWER CONTROL IN A WIRELESS OVERLAY NETWORK

(75) Inventors: Martin Morris, San Diego, CA (US); Rajiv Kumar, San Diego, CA (US); Lyn Nguyen, San Diego, CA (US); Hiep Pham, San Diego, CA (US)

(73) Assignee: Widcomm, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,385

(22) Filed: Jul. 6, 1999

(65) Prior Publication Data

US 2003/0013474 A1 Jan. 16, 2003

(51) Int. Cl.[7] .............................. H04B 1/38; H04M 1/00
(52) U.S. Cl. .................... 455/522.1; 455/443; 455/454; 455/426.1
(58) Field of Search ........................... 455/422, 7, 571, 455/522, 69, 443, 553, 68, 426, 436, 509, 454, 418, 419, 425, 420, 462, 465, 552, 427

(56) References Cited

U.S. PATENT DOCUMENTS

| | | | |
|---|---|---|---|
| 5,490,139 A | 2/1996 | Baker et al. ................. 370/60 |
| 5,499,395 A | * 3/1996 | Doi ............................ 455/422 |
| 5,572,528 A | 11/1996 | Shuen ..................... 370/85.13 |
| 5,636,216 A | 6/1997 | Fox et al. ................... 370/402 |
| 5,652,751 A | 7/1997 | Sharony .................... 370/227 |
| 5,696,903 A | 12/1997 | Mahany |
| 5,699,353 A | 12/1997 | Kent ......................... 370/315 |
| 5,708,655 A | 1/1998 | Toth et al. ................. 370/313 |

(List continued on next page.)

FOREIGN PATENT DOCUMENTS

| | | |
|---|---|---|
| EP | 0695059 A1 | 1/1996 |
| WO | WO 99 14897 A | 3/1999 |
| WO | WO 99/14897 | 3/1999 |

OTHER PUBLICATIONS

Haartsen, Jaap, "Bluetooth—the universal radio interface for ad hoc, wireless connectivity", Ericsson Review, Se, Ericsson (3):110–117, (1998).

Haartsen, Jaap, "Bluetooth—The universal radio interface for ad hoc, wireless connectivity," *Ericsson Review*, No. 3, pp. 110–117, (1998).

"Specification of the Bluetooth System, Core, Version 1.0B," *Bluetooth SIG Specifications*, pp. 18–42, (Dec. 1, 1999).

Bluetooth Adopter's website: "Specification of the Bluetooth System" v.0.8 Jan. 22, 1999 (pp. 1–224).

Geneseo.edu—website: "PMDF System Manager's Guide—PMDF–REF–5.1; Overview of PMDF" (pp. 1 of 1; 1 of 2 and 2 of 2).

*Primary Examiner*—Nay Maung
*Assistant Examiner*—John J Lee
(74) *Attorney, Agent, or Firm*—Cooley Godward LLP (57) ABSTRACT

A method and apparatus for internetworked communication between first and second wireless networks containing first and second pluralities of wireless nodes, respectively, is disclosed herein. In a preferred implementation a first dual-power node participates in both a first wireless network and an overlay network. The dual-power node is configured to transmit and receive in both a high-power mode and a low-power mode. The dual-power node operates in an overlay network and facilitates data transmission between low-power nodes and high-power nodes by toggling between these two power modes. In a preferred implementation, a third wireless network containing a third plurality of wireless nodes is utilized. The overlay network can accommodate a plurality of high-power or dual-power nodes.

19 Claims, 9 Drawing Sheets

U.S. PATENT DOCUMENTS

| | | | |
|---|---|---|---|
| 5,754,547 A | | 5/1998 | Nakazawa .................. 370/401 |
| 5,794,141 A | * | 8/1998 | Zicker et al. ............... 455/418 |
| 5,812,531 A | | 9/1998 | Cheung et al. ............. 370/255 |
| 5,825,772 A | | 10/1998 | Dobbins et al. ............ 370/396 |
| 5,835,061 A | | 11/1998 | Stewart ...................... 342/457 |
| 5,845,081 A | | 12/1998 | Rangarajan et al. ... 395/200.54 |
| 5,850,592 A | * | 12/1998 | Ramanathan .................. 455/7 |
| 5,854,899 A | | 12/1998 | Callon et al. .......... 395/200.68 |
| 5,873,033 A | * | 2/1999 | Hjern et al. ................ 455/417 |
| 5,884,187 A | * | 3/1999 | Ziv et al. .................... 455/522 |
| 5,901,357 A | * | 5/1999 | D'Avello et al. ........... 455/454 |
| 6,134,437 A | * | 10/2000 | Karabinis et al. ........... 455/427 |
| 6,167,278 A | * | 12/2000 | Nilssen ....................... 455/462 |
| 6,192,400 B1 | * | 2/2001 | Hanson et al. ............. 370/310 |
| 6,246,886 B1 | * | 6/2001 | Oliva ......................... 455/553 |
| 6,434,158 B1 | * | 8/2002 | Harris et al. ................ 370/401 |
| 6,487,180 B1 | * | 11/2002 | Borgstahl et al. ........... 455/414 |

* cited by examiner

IMPLEMENTATION OF POWER CONTROL IN A WIRELESS OVERLAY NETWORK

REFERENCE TO RELATED PATENT APPLICATIONS

The entire disclosure of the copending U.S. patent application Ser. No. 09/347,894 entitled DISTRIBUTED MANAGEMENT OF AN EXTENDED NETWORK CONTAINING SHORT-RANGE WIRELESS LINKS, filed on even date herewith, the specification of which is hereby incorporated by reference.

FIELD OF THE INVENTION

The present invention generally pertains to communication systems, and more particularly to an inter-networked communication system containing a dual-powered node.

BACKGROUND OF THE INVENTION

Traditionally, electronic devices used in an office network relied on alternating current "AC" power as their power source. A typical office configuration consisted of, at a minimum, several computers, a printer, and a central data storage device. The traditional office also typically employed hardwired connections from one device to another. Conveying information from one device to another was accomplished by using a wired backbone network. Thus, a user desiring to route data from a computer to a printer sent the necessary data over a cable from his or her computer to a local printer.

More recently, office configurations incorporate both AC powered devices and battery operated, or wireless, devices such as personal digital assistants ("PDA"), pagers, laptop computers, and the like. While these devices run on battery power and thus do not require a wired connection for power, unless they are configured with a transmit antenna and an amplifier and are located in close proximity to a device capable of receiving data transmission, these wireless devices must transfer data to external devices via traditional wired backbones. Technologically speaking, it is fairly straightforward to couple a wireless device to a transmit antenna and an amplifier for the purpose of routing data from the wireless device to a standard AC device. One difficulty with this configuration is that wireless devices, unlike AC devices, have a limited power supply and, therefore, must minimize power consumption. System designers thus generally must make a trade-off between extended transmission range and power conservation.

Transmission range of a wireless device without an amplifier is typically limited to somewhere on the order of ten meters. If the user is operating the wireless system exclusively in his or her office, this range limitation is typically not an issue. If, however, the user seeks to operate the wireless device outside of his or her office, AC devices intended to receive the data within the office will be out of range. Even if there are other AC devices within range of the wireless unit at the moment that the user wishes to transmit data, these intermediary devices will be unhelpful unless some wired backbone is in place to transfer the data to the desired AC device. That is, the data will remain stored at the AC device receiving the data. For example, assume a user is in conference room and is using a PDA out of range of the AC devices in his individual office. If the user wishes to print a color copy of a chart stored on the PDA using the color copier located in his office, he will be required to leave the conference room and move within the range of his color printer. This undesirable limitation has been overcome by employing a wired network connecting all of the AC devices in a particular office. Once the devices are physically connected, it becomes possible to route data from the wireless device to anywhere in the office. Unfortunately, such hardwired networks are inflexible and can be difficult to install and maintain.

SUMMARY OF THE INVENTION

Briefly, therefore, this invention provides for a method and apparatus for internetworked communication. The system of the invention includes at least a first wireless network containing a first plurality of wireless nodes and an overlay network containing a second plurality or wireless nodes. In a preferred embodiment, a first dual-power node participates in both the first wireless network and in the overlay network and operates in a time-division multiplexed manner. Specifically, the first dual-power node communicates with the first plurality of wireless nodes at a first power level during certain time slots, and with at least one of the second plurality of wireless nodes at a second power level during other time slots. The inventive system may also include a third wireless network containing a third plurality of wireless nodes, at least one of which is also included in the second plurality of wireless nodes.

In a preferred embodiment, the dual-power node contains a low-power transceiver, a high-power transceiver, and a controller for facilitating toggling between operation in high-power and low-power nodes. The overlay network may also contain a second dual-power node capable of communicating with the first dual-power node at high power and with the third plurality of wireless nodes at a lower power.

The overlay network is preferably initialized pursuant to a protocol in which one high-power device becomes operative as a master node and the remaining high-power devices act as slave nodes. Pursuant to this protocol, the master node transmits a notification signal identifying itself as a high-power device and indicating the identity and connectivity of its overlay network. This notification message signals the other high-power devices that the overlay network contains a master node and that additional nodes seeking to join the network should act as slave nodes. Accordingly, when a high-power node or a dual-power node initially powers-up, it monitors the network to determine whether any of the high-power or dual-power devices are presently acting as master nodes. If a master node does not currently exist, the high-power or dual-power device assumes the role of master node.

DETAILED DESCRIPTION OF THE INVENTION

The present invention is more fully described with reference to FIGS. 1–9. An exemplary implementation of the invention is discussed and illustrated with reference to its implementation using wireless networks predicated on the proposed "Bluetooth" wireless communications protocol. This protocol contemplates the grouping of physically proximate wireless nodes, and is described in *Specification of the Bluetooth System*, v0.8, Jan. 22, 1999 (and in subsequent revisions thereof). It should be understood that this invention is not limited to such a wireless protocol, and could be similarly implemented using other types of wireless networks.

Figure 1:
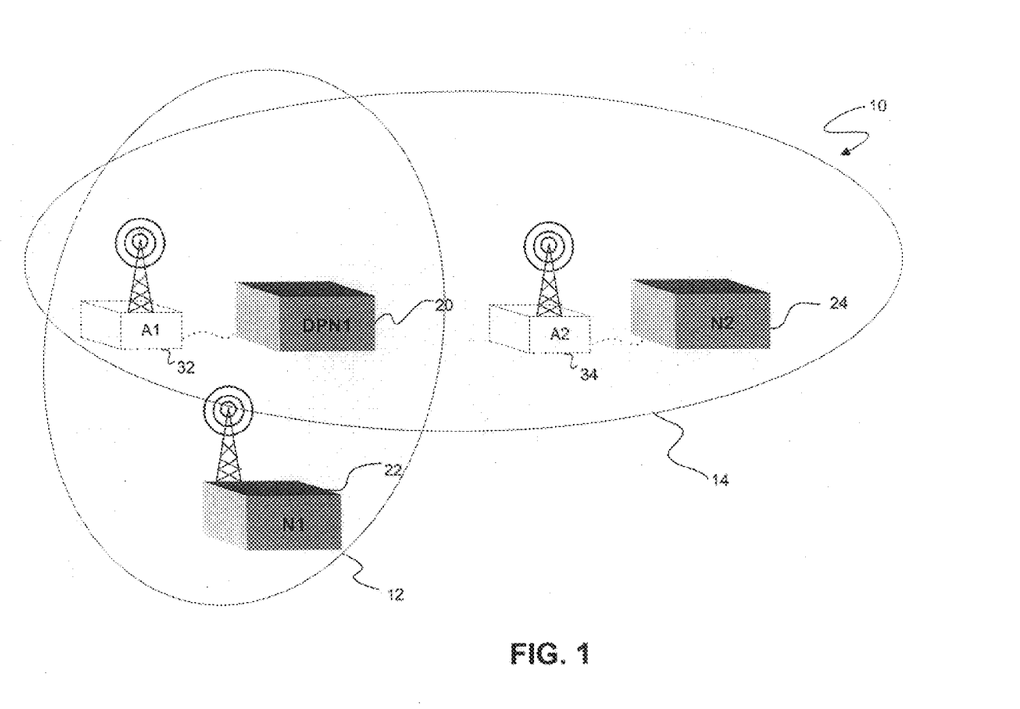
FIG. 1 illustrates a first and second pluralities of wireless nodes, respectively, configured within a first wireless network and within an overlay network in accordance with the present invention.

FIG. 1 illustrates a communication system 10 comprised of first and second pluralities of wireless nodes configured within a first wireless network 12 and within an overlay network 14, respectively. The first wireless network 12 is comprised of a first dual-power node 20 and a first plurality of wireless nodes 22. While FIG. 1 only depicts one wireless node in the first wireless network 12, the present invention could accommodate a plurality of wireless nodes in the first wireless network 12. The overlay network 14 is comprised of the first dual-power node 20 and a second plurality of wireless node 24.

The first plurality of wireless nodes 22 operate as low-power nodes, while the second plurality of wireless nodes 24 operate as high-power nodes. For purposes of example, a low-power node is typically limited to a maximum power level of 2.5 mW or to a maximum transmission range of 10 meters. High-power nodes are capable of exceeding these power levels and transmission ranges. The dual-power node 20 is capable of operating in both high-power and in low-power modes, and is more precisely depicted in FIG. 3.

Referring again to FIG. 1, a dual-power node 20 of the overlay network 14 receives data from low-power devices located closely proximate thereto. This data is then forwarded to other high-power nodes (e.g., to node 24) or to other dual-power devices (not shown) located within the overlay network 14. In this way low-power electronic devices within an office environment are able to transfer data to devices well beyond their transmission ranges.

In a preferred embodiment, the dual-power node 20 and high-power node 24 are respectively coupled to power amplifiers 32 and 34. Coupling power amplifiers 32 and 34 to the dual-power node 20 and the high-power node 24 can increase their transmission capabilities by at least an order of magnitude. In a preferred implementation dual-power node 20 and high-power node 24 operate using AC power, which removes the power consumption of amplifiers 32 and 34 as a relevant design concern.

Figure 2:
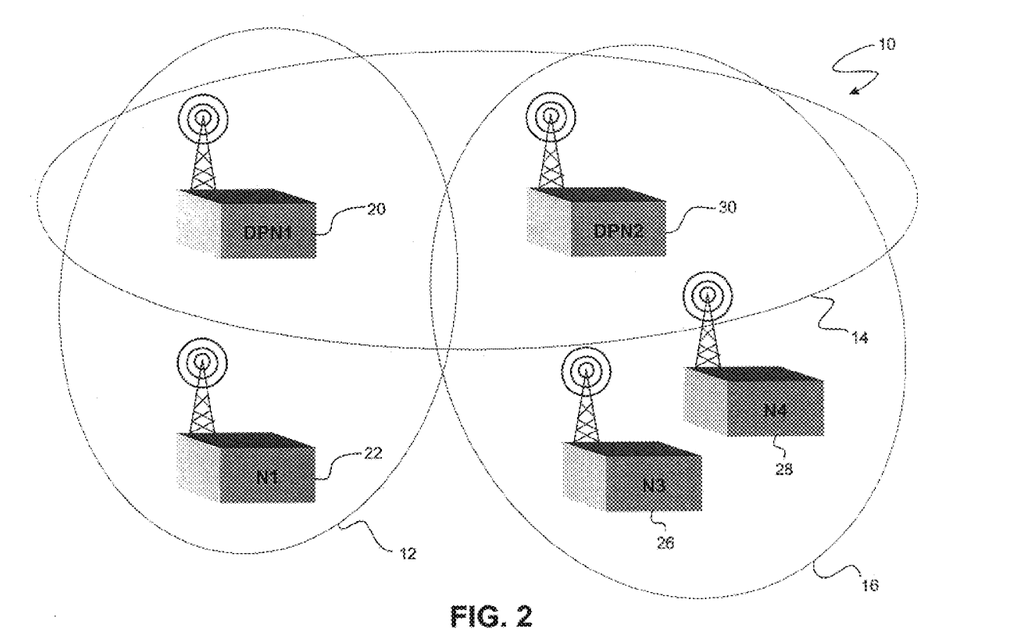
FIG. 2 illustrates first, second, and third pluralities of wireless nodes respectively configured in a first wireless network, an overlay network, and in a third wireless network.

FIG. 2 illustratively represents an embodiment in which a third wireless network 16 has been added to the system of FIG. 1. The third wireless network 16 contains a third plurality of low-power wireless nodes 26 and 28. In addition, a second dual-power node 30 has been added to the overlay network 14. This second dual-power node 30 operates in a similar fashion as the first dual-power node 20, communicating with both the low-power nodes in the third wireless network 16 and the high-power nodes in the overlay network 14.

Figure 3:
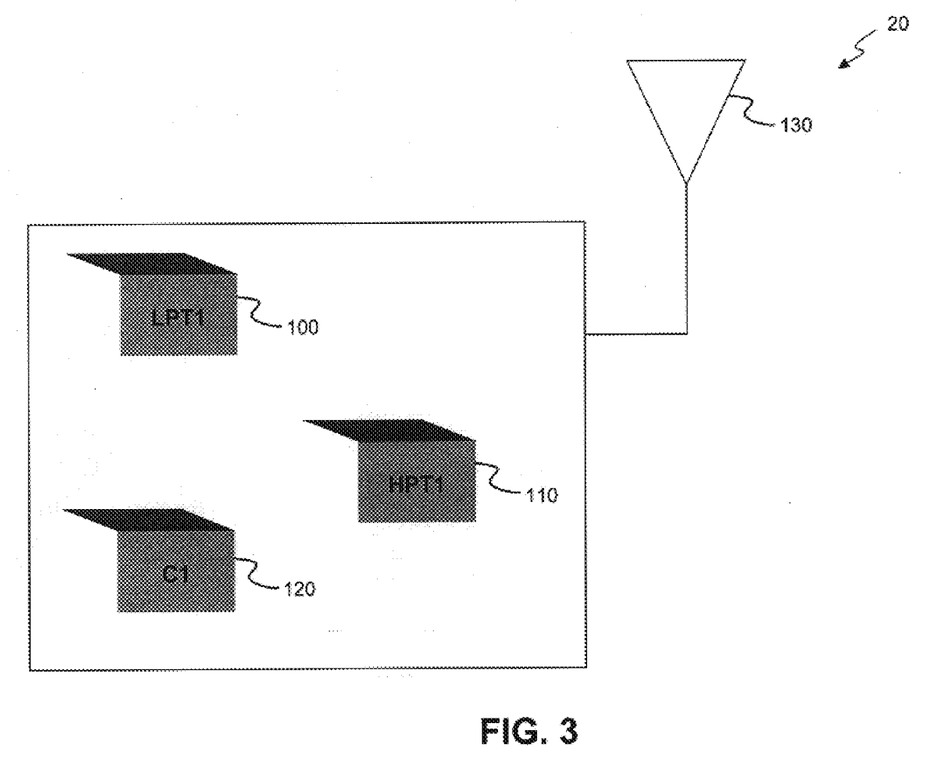
FIG. 3 is a block diagram of a dual-power node configured in accordance with the present invention.

As previously mentioned, FIG. 3 is a detailed depiction of the interior of the dual-power node 20. In a preferred implementation the dual-power node 20 consists of a low-power transceiver 100, a high-power transceiver 110, a controller 120, and an omni-directional antenna 130. Alternate implementations may contemplate use of a common transceiver rather than separate high-power and low-power transceivers, and antenna configurations other than omnidirectional. The controller 120 allows the dual power node 20 to toggle between operating as a high-power node and a low-power node.

Figure 4:
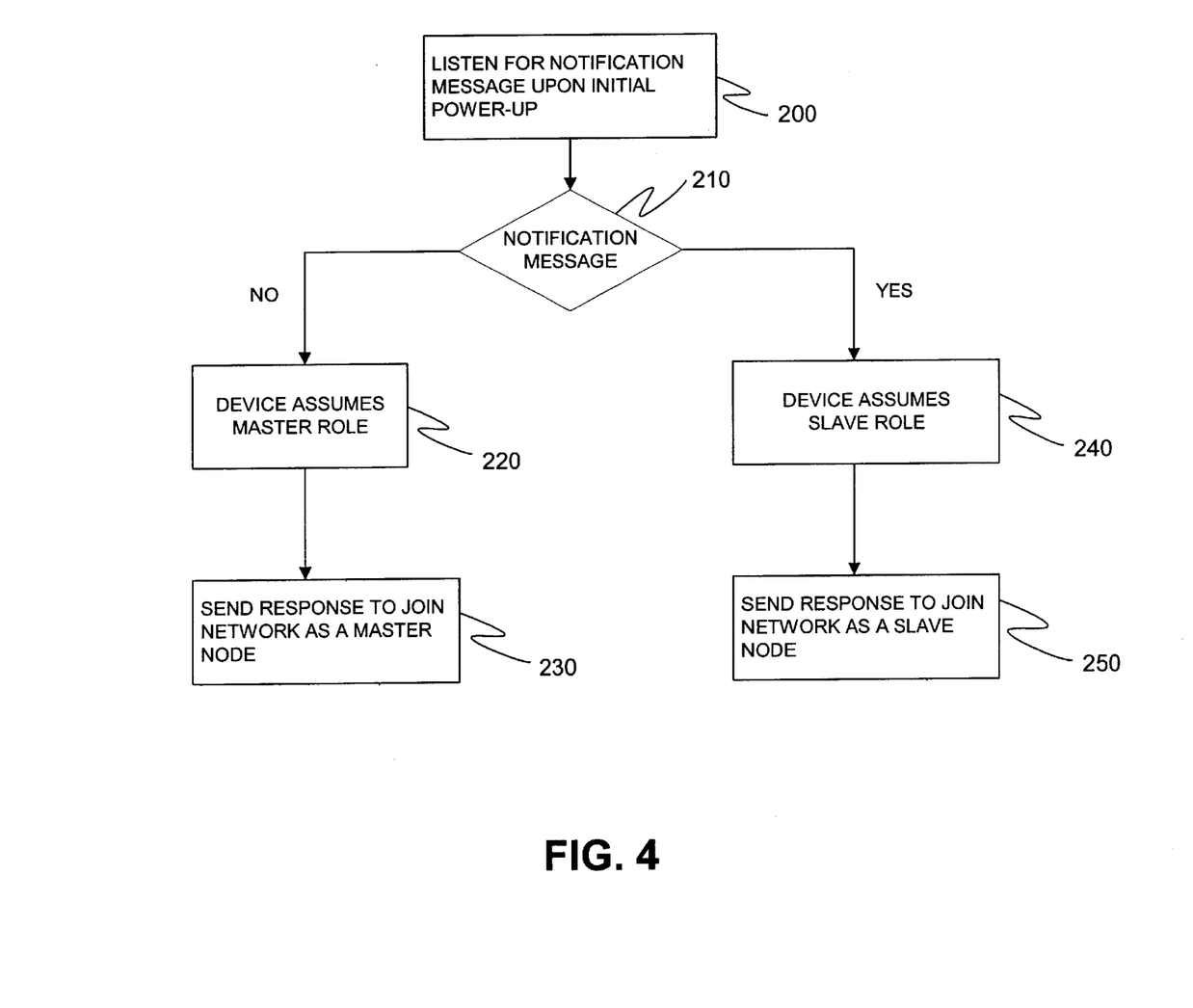
FIG. 4 is a flow chart representative of the process of transmitting broadcasts from master nodes and advertisements from slave nodes.

In a preferred implementation, the nodes 20 and 24 of the overlay network 14 operate in a hierarchical fashion such that one node acts as a master node while all other nodes behave as slave nodes. FIG. 4 contains a flow chart representation of the procedures followed in connection with establishing a master node within the overlay network 14. As is indicated by FIG. 4, a first step in establishing a master/slave configuration occurs upon initial power-up of the device 200. At that point, the device "listens" for a notification message 210 which would indicate that an overlay network 14 has already been established. If a notification message is not detected, the device assumes the role of master device 220 and begins periodically transmitting notification messages 230. In addition to identifying the sender as a high power device, these notification messages are transmitted at maximum power and contain the identity and connectivity of the network as disclosed in the above-referenced copending U.S. Patent Application. If, on the other hand, an already established master device is heard upon initial power-up, the device assumes the role of a slave 240. The slave node transmits a network type-specific response indicating that it wishes to join the network 250. The transmitted message may also contain information identifying the node and its connectivity.

The present invention contemplates the establishment of several different types networks comprised of various combinations of high-power and low-power nodes: (1) networks between high-power or dual-power nodes; (2) networks between low power nodes; and, (3) networks between dual-power nodes and low-power nodes. In a preferred implementation, the timing of signal transmission and reception is the same in networks containing only high-power nodes as in networks containing only low-power nodes.

Figure 5A:
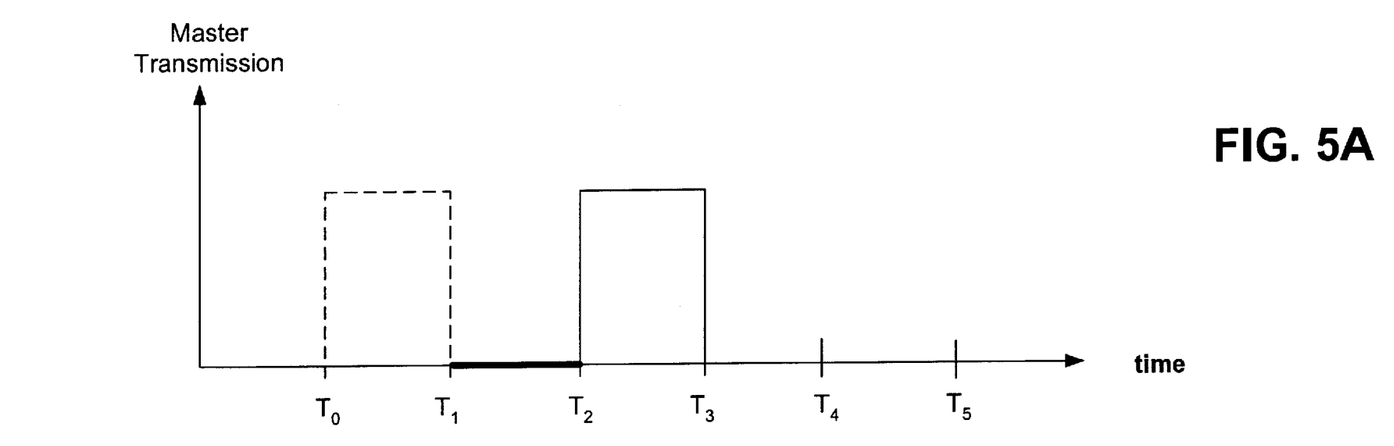
FIG. 5 shows the timing sequence for establishing a network when the participating nodes are operating at the same power level.
Figure 5B:
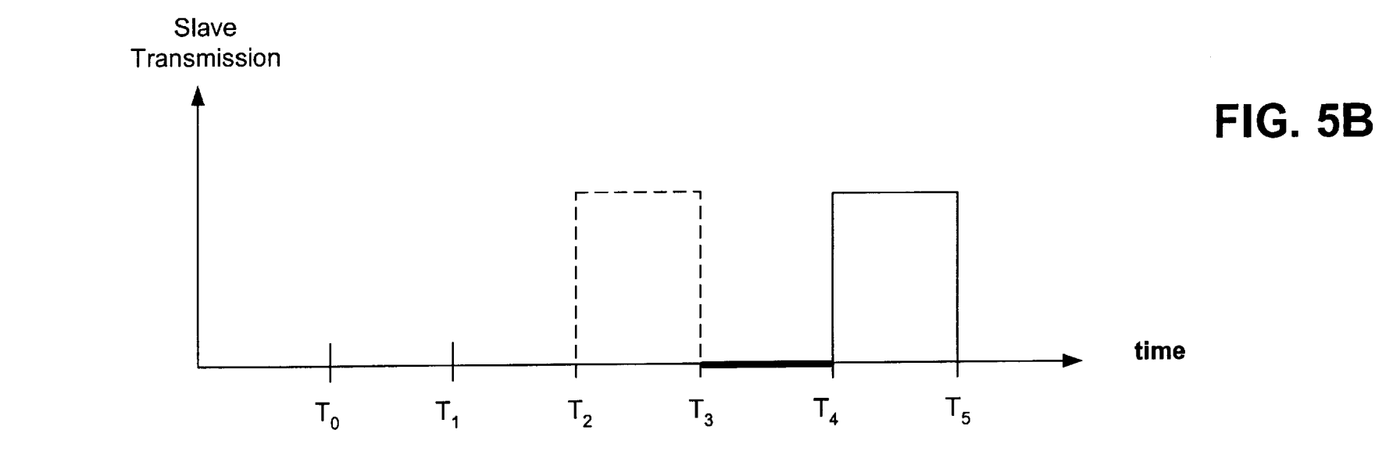

FIG. 5 is a timing diagram representative of the establishment of a network by nodes transmitting at the same, or about the same, power level. Specifically, FIG. 5A is a timing diagram associated with the process by which a device assumes a master role in establishment of a network. Similarly, FIG. 5B is a timing diagram associated with the process by which a device assumes a slave role within an already established network.

Turning now to FIG. 5A, upon power-up at $T_0$ a device seeking to establish or join a network first attempts to locate an existing network by listening for a notification message. At $T_1$, the device determines whether it has received a notification message while monitoring the network. If by $T_2$ the device determines that no notification message has been detected, the device initiates establishment of a network by assuming the role of a master node and transmitting a notification message. The notification message is transmitted during the interval bounded by between $T_2$ and $T_3$, and contains identification and network connectivity information. The notification message also identifies the sender as either a high-power node or a low-power node.

Referring now to FIG. 5B, upon power-up at $T_2$ a device determines whether a network is operational by listening for a notification message. At $T_3$, the device determines whether a notification message has been heard by processing the information received during the listening period. For purposes of example, assume that the device at $T_4$ ascertains that a notification message was received during such listening period. Since a notification message has been previously transmitted, if the device is to join the existing network it must do so as a slave node. Accordingly, at $T_4$ the device sends a message indicating that it desires to join the established network as a slave node. This notification message identifies the power level of the node and may also contain network connectivity information.

Figure 6A:
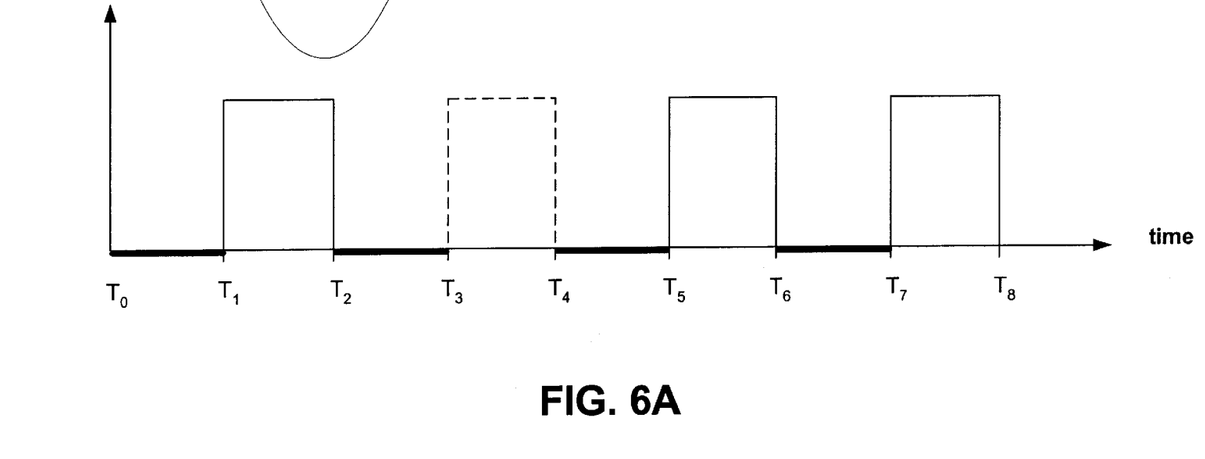
FIG. 6 depicts the timing sequence for establishing a network between nodes that are operating at different power levels.
Figure 6B:
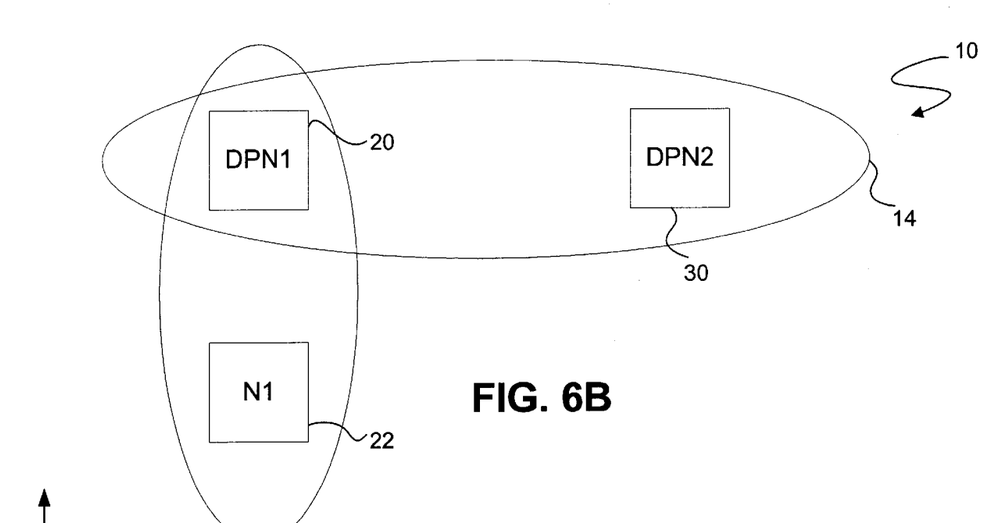

FIG. 6A is a timing diagram relevant to the establishment of a network in which information is exchanged between dual-power and low-power nodes. Such a network may be established between dual-power nodes and low-power nodes when a low-power node desires to take advantage of the relaying capabilities of an overlay network of the present invention; that is, in situations where the low-power node requests communication with a node within the overlay network, but outside of transmission range of the low-power node. The timing diagram of FIG. 6A is described below with reference to FIG. 6B, which includes a subset of the elements within the system of FIG. 2.

Referring now to FIG. 6A, at $T_0$ the first wireless node 22 determines that it is desired to transmit data to the second dual-power node 30. After making this decision, the wireless node 22 attempts to transmit the desired data stream to the second dual-power node at $T_1$. At $T_2$, node 22 waits for a reply from the second dual-power node 30. If no reply is detected, node 22 listens for the notification message being transmitted by the master node 20 of the overlay network 14. This notification message contains information regarding the connectivity of the overlay network 14, i.e., what nodes are available within the overlay network 14. From this connectivity information, node 22 determines at $T_4$ that it can access dual-power node 30 via dual-power node 20. In order to accomplish this data relay, wireless node 22 initiates contact with dual-power node 20 at $T_5$. When dual-power node 20 is not transmitting in high-power mode, at $T_6$ it transitions to low-power mode and initiates a low-power network with low-power node 22. Node 22 is then able, at $T_7$, to relay the data to dual power-node 20. At the end of this data transmission ($T_8$), dual-power node 20 transitions to high-power mode and relays the data it received from low-power node 22 to dual-power node 30.

Figure 7:
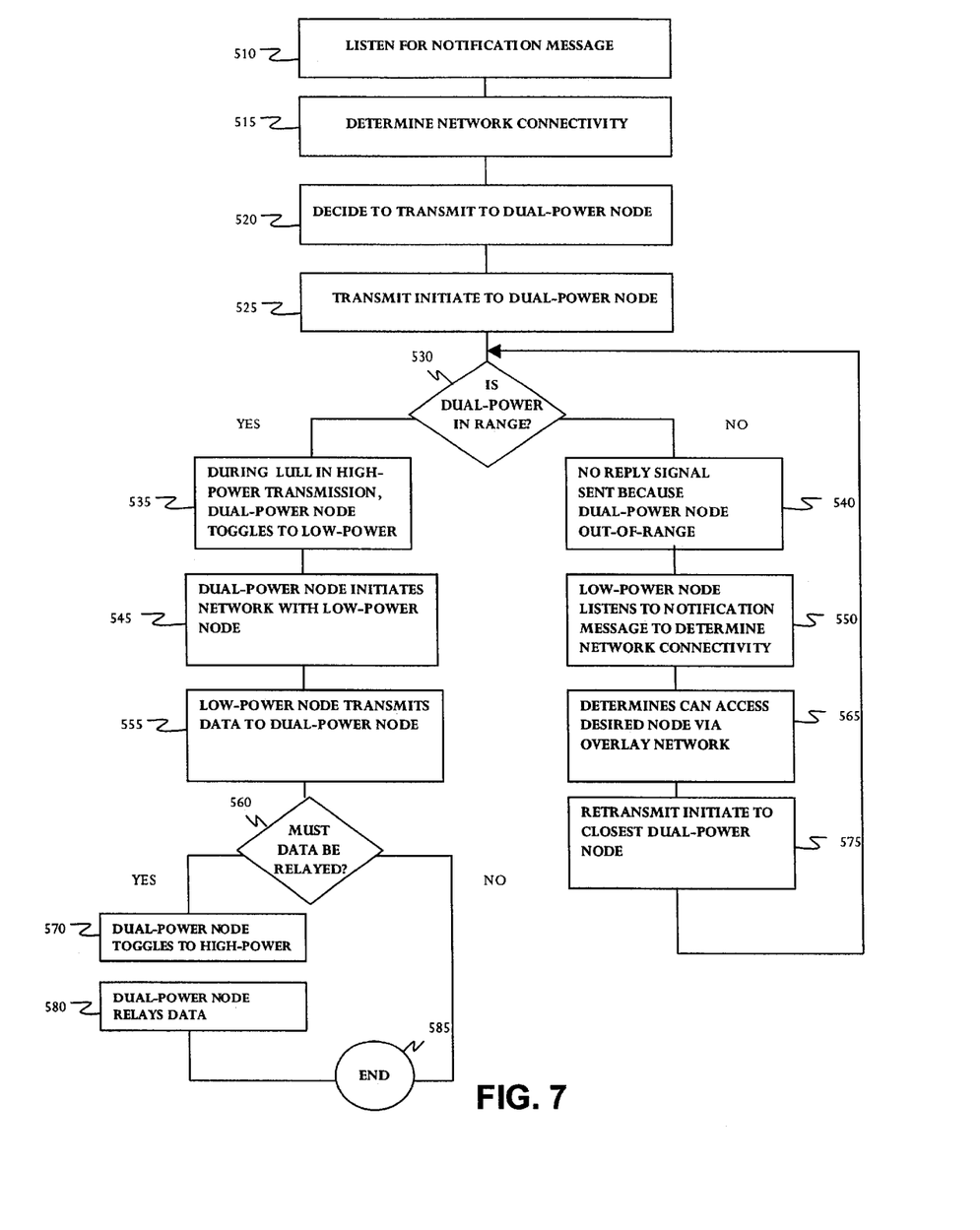
FIG. 7 is a flow chart representative of a process for relaying data from a low-power node to a node in an overlay network.

FIG. 7 is a flow chart representation of the sequence of logical steps necessary to establish a network between a low-power node and a dual-power node. Referring to FIG. 7, at step 510 the low-power node 22 (FIG. 2) listens for a notification message that indicating which services are available within the various networks presently operating. Based upon the notification message, at step 515 the low-power node 22 discerns: (i) which services are available within each operating networks, and (ii) the connectivity between the devices offering such services. For purposes of example, assume that based upon the notification message low-power node 22 ascertains the existence of an overlay network 14 having dual-power node 20 as master node and dual-power node 30 as a slave node. Next, in step 520 low-power node 22 determines it desires to transmit data to dual-power node 30. At step 525, the low-power node 22 attempts to initiate communication with overlay network 14 by transmitting a request to dual-power node 30.

If dual-power node 30 is beyond the transmission range of low-power node 22, dual-power node 30 will not hear the request signal sent by node 22. As a consequence, dual-power node 30 will not transmit a reply signal (step 540). Upon not receiving any response from dual-power node 30, low-power will conclude that dual-power node 30 is beyond its transmission range. Node 22 then once again listens for and receives the notification message in order to determine whether another network is available to relay data from node 22 to dual-power node 30 (step 550). At step 565, node 22 determines that it can access dual-power node 30 via the overlay network 14, which as mentioned above includes both dual-power nodes 20 and 30. At step 575, node 22 then retransmits its request to initiate communication to node 20.

Upon receiving a request signal from node 22, dual-power node 20 initiates establishment of a low-power network between itself and node 22. As an initial step in establishing this low-power network, the dual-power node 20 transitions from a high-power mode to a low-power mode (step 535). Once dual-power node 20 has been operating in a low-power mode, it becomes able to establish a low-power network with low-power node 22 (step 545). Low-power node 22 then transmits data as desired to dual-power node (step 535). The dual-power node 20 then determines whether and the data must be relayed to another node in the overlay network 14 (step 560). If the data must be so relayed, the dual-power node transitions back to high-power mode and relays the data to node 30 (steps 570 and 580).

Figure 8:
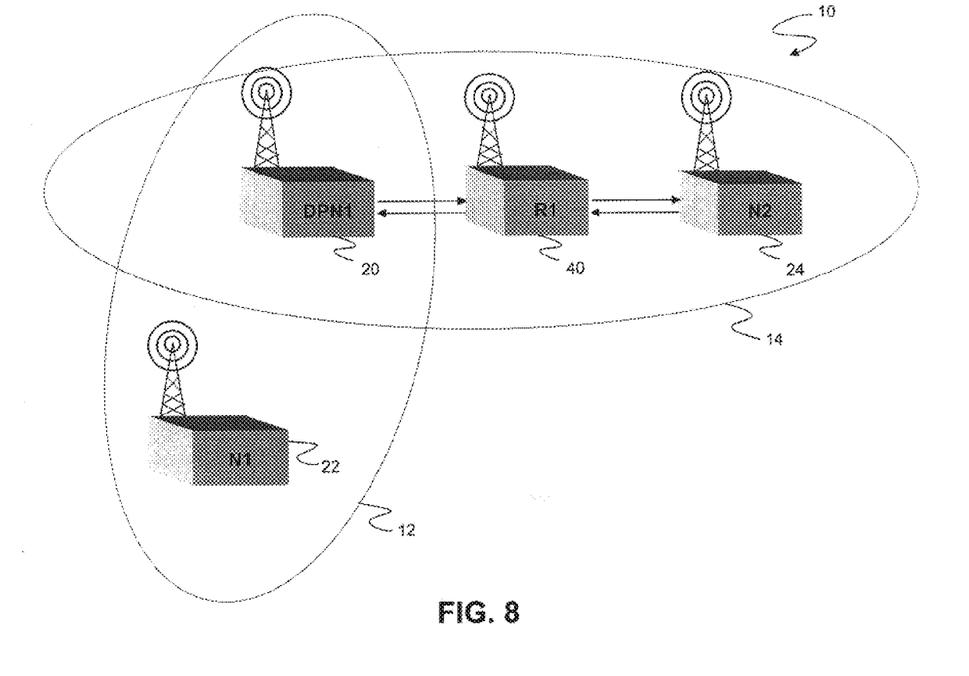
FIG. 8 illustrates the inclusion of a relay node within an overlay network in accordance with the present invention.
Figure 9:
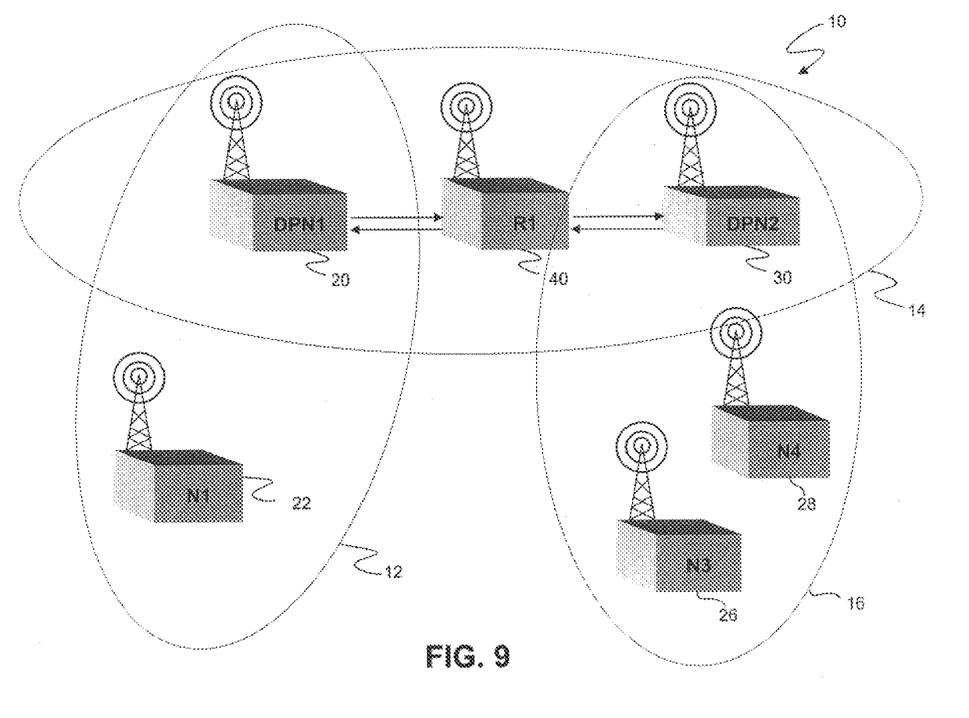
FIG. 9 illustrates a system including first and second wireless networks linked by an overlay network containing a relay node.

FIGS. 8 and 9 depict alternately preferred embodiments of the present invention in which overlay network 14 has been modified to incorporate a relay node 40. A relay node 40 may be included within the overlay network 14 when its constituent nodes are too widely dispersed to communicate with each other. In the embodiments of FIGS. 8 and 9, the relay node 40 operates as a high-power node. The relay node 40 is capable of communication with the nodes in the overlay network 14 in accordance with the applicable protocols, thereby enabling traffic to be transparently relayed between such nodes. Because the relay node 40 is a high-power node, it establishes a connection between itself and nodes within the overlay network 14 in accordance with the timing diagram of FIG. 5.

Although the above application has been described primarily with reference to specific embodiments, one skilled in the art can readily appreciate that the teachings of the present invention may be applied in other communication contexts. Thus the application is meant only to be limited by the scope of the appended claims.

What is claimed is:

1. A communication system comprising:
   a first wireless network including a first plurality of wireless nodes wherein the first plurality of wireless nodes are configured to intercommunicate at a first power level;
   an overlay network including a second plurality of wireless nodes wherein the second plurality of wireless nodes are configured to intercommunicate at a second power level; and
   a first dual-power node included within said first plurality of wireless nodes and within said second plurality of wireless nodes, said first dual-power node including:
   means for receiving, when operative in a low-power mode, information transmitted at the first power level by one of said first plurality of wireless nodes;

means for transmitting said information, at the second power level wherein the second power level is substantially greater than said first power level, to at least one of said second plurality of wireless nodes when operative in a high-power mode; and means for transitioning between operation in said low-power mode and said high-power mode.

2. The communication system of claim 1 wherein said first dual-power node is operative in a low-power mode and in a high-power mode, said first dual-power node further including:

means for receiving network information, while operative in said low-power mode, from said first plurality of wireless nodes; and means for transmitting, at said second power level and while operative in said high-power mode, said network information to said at least one of said second plurality of wireless nodes.

3. The communication system of claim 1 further including a relay node in said overlay network, said relay node including:

means for transmitting information between said first dual-power node and said at least one of said second plurality of wireless nodes.

4. A communication system comprising:

a first wireless network including a first plurality of wireless nodes;

an overlay network including a second plurality of wireless nodes;

a first dual-power node included within said first plurality of wireless nodes and within said second plurality of wireless nodes, said first dual-power node including:

means for receiving when operative in a low-power mode, information transmitted at a first power level by one of said first plurality of wireless nodes;

means for transmitting said information, at a second power level substantially greater than said first power level, to at least one of said second plurality of wireless nodes when operative in a high-power mode; and means for transitioning between operation in said low-power mode and said high-power mode; and a third wireless network containing said at least one of said second plurality of wireless nodes and a third plurality of wireless nodes, said at least one of said second plurality of wireless nodes including:

means for transmitting information, at a third power level, to said third plurality of wireless nodes; and means for transmitting information, at a fourth power level substantially greater than said third power level, to said first dual-power node.

5. The communication system of claim 4 further including a relay node in said overlay network, said relay node including:

means for transmitting information between said first dual-power node and said at least one of said second plurality of wireless nodes.

6. The communication system of claim 2 wherein said first dual-power node further includes:

means for operating as a first master node; and
means for operating as a first slave node.

7. The communication system of claim 2 wherein said at least one of said second plurality of wireless nodes is a second dual-power node including:

means for determining if said first dual-power node is operating as a master node;

means for operating as a second slave node; and
means for operating as a second master node.

8. A communication system comprising:

a first wireless network including a first dual-power node and a first plurality of low-power wireless nodes, wherein the first plurality of low-power wireless nodes are configured to intercommunicate in accordance with a first communication protocol, said first dual-power node toggling between operation in a high-power mode and in a low-power mode such that said first dual-power node communicates with said first plurality of low-power wireless nodes in accordance with the first communication protocol while operative in said low-power mode; and an overlay network comprising a second plurality of nodes configured to intercommunicate in accordance with a second communication protocol, the overlay network including at least one node disposed to communicate with said first dual-power node according to a second communication protocol while said first dual-power node is operative in said high-power mode, said first dual-power node transmitting information received from one of said first plurality of low-power nodes to said at least one node.

9. A communication system comprising:

a first wireless network including a first dual-power node and a first plurality of low-power wireless nodes said first dual-power node toggling between operation in a high-power mode and in a low-power mode such that said first dual-power node communicates with said first plurality of low-power wireless nodes while operative in said low-power mode;

an overlay network including at least one node disposed to communicate with said first dual-power node while said first dual-power node is operative in said high-power mode, said first dual-power node transmitting information received from one of said first plurality of low-power nodes to said at least one node; and a third wireless network having a dual-power node and a second plurality of low-power wireless nodes, said dual-power node communicating with said overlay network while operative in a higher-power mode and with said second plurality of low-power wireless nodes while operative in a lower-power mode.

10. In a communication system including a first wireless network having a first plurality of wireless nodes configured for communication in a low-power mode and an overlay network having a second plurality of wireless nodes configured for communication in a high-power mode, a dual-power node included within said first plurality of wireless nodes and within said second plurality of wireless nodes, said dual-power node comprising:

a first transceiver operative to receive, during operation of said dual-power node in said low-power mode, information transmitted within a first range of power levels by said first plurality of wireless nodes, wherein said first plurality of wireless nodes are configured to intercommunicate within the first range of power levels; and a second transceiver operative to transmit said information within a second range of power levels to said second plurality of wireless nodes during operation of said dual-power node in said high-power mode wherein said second plurality of wireless nodes are configured to intercommunicate within the first range of power levels.

11. The dual-power node of claim 10 wherein said dual-power node further includes a controller for transitioning said dual-power node between operation in said low-power mode and said high-power mode as required to communicate with ones of said first plurality of wireless nodes and one of said second plurality of wireless nodes.

12. The dual-power node of claim 10 wherein said first transceiver transmits a first notification message indicative of low-power mode operation and said second transceiver transmits a second notification message indicative of high-power mode operation.

13. In a communication system including a first wireless network having a first plurality of wireless nodes configured for communication in a low-power mode and an overlay network having a second plurality of wireless nodes configured for communication in a high-power mode, a dual-power node included within said first plurality of wireless nodes and within said second plurality of wireless nodes, said dual-power node comprising:
  a transceiver operative to receive information within a first range of power levels from said first plurality of wireless nodes during operation of said dual-power node in said low-power mode and operative to transmit said information within a second range of power levels to said second plurality of wireless nodes during operation of said dual-power node in said high-power mode, said second range of power levels being distinct from said first range of power levels; and
  a controller for transitioning said dual-power node between operation in said low-power mode and said high-power mode;
  wherein said first plurality of wireless nodes intercommunicate within the first range of power levels and said second plurality of wireless nodes intercommunicate within the second range of power levels.

14. The dual-power node of claim 13 wherein said transceiver is configured to:
  receive network information, during operation in said low-power mode, from said first plurality of wireless nodes, and
  transmit said network information to said at least one of said second plurality of wireless nodes during operation in said high-power mode.

15. The dual-power node of claim 13 wherein said transceiver transmits a first notification message indicative of low-power mode operation and a second notification message indicative of high-power mode operation.

16. A communication system comprising:
  a first wireless network including a first plurality of wireless nodes, wherein the first plurality of wireless nodes intercommunicate within a low-power transmission range;
  an overlay network including a second plurality of wireless nodes, wherein the second plurality of wireless nodes intercommunicate within a high-power transmission range; and
  a first dual-power node included within said first plurality of wireless nodes and within said second plurality of wireless nodes, said first dual-power node including:
    a first transceiver module configured to receive information within the low-power transmission range from said first plurality of wireless nodes during operation of said dual-power node in a low-power mode;
    a second transceiver module configured to transmit said information within the high-power transmission range to said second plurality of wireless nodes during operation of said dual-power node in a high-power mode, said high-power transmission range being distinct from said low-power transmission range; and
    a controller for transitioning between operation in said low-power mode and said high-power mode.

17. In a communication system including a first wireless network having a first plurality of wireless nodes configured for communication in a low-power mode and an overlay network having a second plurality of wireless nodes configured for communication in a high-power mode, a method for communicating message information comprising:
  receiving, at one of said first plurality of wireless nodes, network connectivity information relating to one of said second plurality of wireless nodes;
  transmitting, in response to said network connectivity information and at a low-power level consistent with said low-power mode, said message information from said one of said first plurality of wireless nodes to a dual-power node wherein said first plurality of wireless nodes intercommunicate at the low-power level; and
  transmitting, at a high-power level consistent with said high-power mode, said message information to said one of said second plurality of wireless nodes, wherein said second plurality of wireless nodes intercommunicate at the high-power level.

18. A communication system comprising:
  a first wireless network including a first dual-power node and a first plurality of low-power wireless nodes, wherein the first plurality of low-power wireless nodes are configured to intercommunicate in accordance with a first communication protocol, said first dual-power node toggling between operation in a high-power mode and in a low-power mode such that said first dual-power node communicates with said first plurality of low-power wireless nodes in accordance with the first communication protocol while operative in said low-power mode; and
  an overlay network comprising a second plurality of nodes configured to intercommunicate in accordance with a second communication protocol, the overlay network including at least one node disposed to communicate with said first dual-power node according to a second communication protocol while said first dual-power node is operative in said high-power mode, said first dual-power node transmitting information received from said at least one node to one of said first plurality of low-power nodes.

19. A communication system comprising:
  a first wireless network including a first plurality of wireless nodes, wherein the first plurality of wireless nodes intercommunicate within a low-power transmission range;
  an overlay network including a second plurality of wireless nodes, wherein the second plurality of wireless nodes intercommunicate within a high-power transmission range; and
  a first dual-power node included within said first plurality of wireless nodes and within said second plurality of wireless nodes, said first dual-power node including:
    a first transceiver module configured to receive information transmitted within the high-power transmission range by said second plurality of wireless nodes during operation of said dual-power node in a high-power mode; and
    a second transceiver module configured to transmit said information within the low-power transmission range to said first plurality of wireless nodes during operation of said dual-power node in a low-power mode, said low-power transmission range being distinct from said high-power transmission range;
    a controller for transitioning between operation in said low-power mode and said high-power mode.

* * * * *